(12) United States Patent
Hasel et al.

(10) Patent No.: US 10,830,152 B2
(45) Date of Patent: Nov. 10, 2020

(54) GAS TURBINE ENGINE COMPRESSOR ARRANGEMENT

(71) Applicant: United Technologies Corporation, Farmington, CT (US)

(72) Inventors: Karl L. Hasel, Manchester, CT (US); Joseph B. Staubach, Colchester, CT (US); Brian D. Merry, Andover, CT (US); Gabriel L. Suciu, Glastonbury, CT (US); Christopher M. Dye, San Diego, CA (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 0 days.

(21) Appl. No.: 15/184,253

(22) Filed: Jun. 16, 2016

(65) Prior Publication Data

US 2016/0290241 A1   Oct. 6, 2016

Related U.S. Application Data

(63) Continuation of application No. 14/179,640, filed on Feb. 13, 2014, which is a continuation-in-part of
(Continued)

(51) Int. Cl.
*F02C 7/36* (2006.01)
*F02K 3/06* (2006.01)
(Continued)

(52) U.S. Cl.
CPC ............ *F02C 7/36* (2013.01); *F02C 3/04* (2013.01); *F02C 3/06* (2013.01); *F02C 3/107* (2013.01);
(Continued)

(58) Field of Classification Search
CPC .................. F02C 3/107; F02K 3/06
See application file for complete search history.

(56) References Cited

U.S. PATENT DOCUMENTS

| 791,383 A | 5/1905 | Vanatta |
|---|---|---|
| 1,142,850 A | 6/1915 | Scholl |

(Continued)

FOREIGN PATENT DOCUMENTS

| EP | 0791383 | 8/1997 |
|---|---|---|
| EP | 1142850 | 10/2001 |

(Continued)

OTHER PUBLICATIONS

GE-1015.002. Jane's Aero-Engines, Issue Seven. Mar. 2000, pp. 510-512. (Year: 2000).*

(Continued)

*Primary Examiner* — Richard A Edgar
(74) *Attorney, Agent, or Firm* — Carlson, Gaskey & Olds, P.C.

(57) ABSTRACT

A gas turbine engine includes, among other things, a fan section, a core engine, a bypass passage, and a bypass ratio defined as the volume of air passing into the bypass passage compared to the volume of air passing into the core engine, the bypass ratio being greater than or equal to about 8 at cruise power. A gear arrangement is configured to drive the fan section. A compressor section includes both a first compressor section and a second compressor section. A turbine section is configured to drive the gear arrangement, and may have a low pressure turbine with four stages and a low pressure turbine pressure ratio greater than about 5:1, and a high pressure turbine with two stages. An overall pressure ratio is provided by the combination of a pressure ratio across the first compressor section and a pressure ratio across the second compressor section, and greater than about 40, measured at sea level and at a static, full-rated takeoff (Continued)

power. The pressure ratio across the second compressor section is greater than about 7.

27 Claims, 5 Drawing Sheets

Related U.S. Application Data application No. 13/869,057, filed on Apr. 24, 2013, now Pat. No. 9,121,367, which is a continuation of application No. 13/590,273, filed on Aug. 21, 2012, now Pat. No. 8,449,247, which is a continuation of application No. 13/418,457, filed on Mar. 13, 2012, now Pat. No. 8,277,174, application No. 15/184,253, which is a continuation-in-part of application No. 13/337,354, filed on Dec. 27, 2011, now Pat. No. 8,337,147, which is a continuation-in-part of application No. 13/294,492, filed on Nov. 11, 2011, now Pat. No. 8,596,965, which is a continuation of application No. 11/858,988, filed on Sep. 21, 2007, now Pat. No. 8,075,261.

(60) Provisional application No. 61/604,646, filed on Feb. 29, 2012.

(51) Int. Cl.
   *F02C 3/107* (2006.01)
   *F02C 3/04* (2006.01)
   *F02K 3/02* (2006.01)
   *F02C 3/06* (2006.01)

(52) U.S. Cl.
   CPC ............... *F02K 3/025* (2013.01); *F02K 3/06* (2013.01); *F05D 2220/32* (2013.01); *F05D 2220/323* (2013.01); *F05D 2260/4031* (2013.01); *F05D 2260/40311* (2013.01)

(56) References Cited

U.S. PATENT DOCUMENTS

| | | | |
|---|---|---|---|
| 2,258,792 A | 10/1941 | New | |
| 2,426,792 A | 9/1947 | Salisbury | |
| 2,936,655 A | 5/1960 | Peterson | |
| 3,021,731 A | 2/1962 | Stoeckicht | |
| 3,194,487 A | 7/1965 | Tyler | |
| 3,287,906 A | 11/1966 | McCormick | |
| 3,352,178 A | 11/1967 | Lindgren | |
| 3,412,560 A | 11/1968 | Gaubatz | |
| 3,747,343 A | 7/1973 | Rosen | |
| 3,754,484 A | 8/1973 | Roberts | |
| 3,792,586 A * | 2/1974 | Kasmarik | F01D 25/162 |
| | | | 384/141 |
| 3,820,719 A | 6/1974 | Clark | |
| 3,892,358 A | 7/1975 | Gisslen | |
| 3,932,058 A | 1/1976 | Harner et al. | |
| 3,935,558 A | 1/1976 | Miller et al. | |
| 3,988,889 A | 11/1976 | Chamay et al. | |
| 4,130,872 A | 12/1978 | Harloff | |
| 4,284,174 A | 8/1981 | Salvana et al. | |
| 4,478,551 A | 10/1984 | Honeycutt, Jr. et al. | |
| 4,649,114 A | 3/1987 | Miltenburger et al. | |
| 4,696,156 A | 9/1987 | Burr et al. | |
| 4,896,499 A | 1/1990 | Rice | |
| 4,916,894 A | 4/1990 | Adamson et al. | |
| 4,979,362 A | 12/1990 | Vershure, Jr. | |
| 5,058,379 A | 10/1991 | Lardellier | |
| 5,102,379 A | 4/1992 | Pagluica et al. | |
| 5,141,400 A | 8/1992 | Murphy et al. | |
| 5,317,877 A | 6/1994 | Stuart | |
| 5,433,674 A * | 7/1995 | Sheridan | F16H 1/2809 |
| | | | 475/346 |
| 5,447,411 A | 9/1995 | Curley et al. | |
| 5,466,198 A | 11/1995 | McKibbin et al. | |
| 5,524,847 A | 6/1996 | Brodell et al. | |
| 5,677,060 A | 10/1997 | Terentieva et al. | |
| 5,778,659 A | 7/1998 | Duesler et al. | |
| 5,857,836 A | 1/1999 | Stickler et al. | |
| 5,915,917 A | 6/1999 | Eveker et al. | |
| 5,975,841 A | 11/1999 | Lindemuth et al. | |
| 5,985,470 A | 11/1999 | Spitsberg et al. | |
| 6,134,880 A | 10/2000 | Yoshinaka | |
| 6,223,616 B1 | 5/2001 | Sheridan | |
| 6,315,815 B1 | 11/2001 | Spadaccini et al. | |
| 6,318,070 B1 | 11/2001 | Rey et al. | |
| 6,387,456 B1 | 5/2002 | Eaton, Jr. et al. | |
| 6,517,341 B1 | 2/2003 | Brun et al. | |
| 6,607,165 B1 | 8/2003 | Manteiga et al. | |
| 6,619,030 B1 | 9/2003 | Seda et al. | |
| 6,709,492 B1 | 3/2004 | Spadaccini et al. | |
| 6,732,502 B2 | 5/2004 | Seda et al. | |
| 6,814,541 B2 | 11/2004 | Evans et al. | |
| 7,021,042 B2 | 4/2006 | Law | |
| 7,328,580 B2 | 2/2008 | Lee et al. | |
| 7,374,403 B2 | 5/2008 | Decker et al. | |
| 7,437,877 B2 | 10/2008 | Kawamoto et al. | |
| 7,591,754 B2 | 9/2009 | Duong et al. | |
| 7,662,059 B2 | 2/2010 | McCune | |
| 7,762,086 B2 * | 7/2010 | Schwark | F01D 25/285 |
| | | | 239/265.11 |
| 7,806,651 B2 | 10/2010 | Kennepohl et al. | |
| 7,824,305 B2 | 11/2010 | Duong et al. | |
| 7,926,260 B2 | 4/2011 | Sheridan et al. | |
| 7,955,046 B2 | 6/2011 | McCune et al. | |
| 7,997,868 B1 | 8/2011 | Liang | |
| 8,075,261 B2 | 12/2011 | Merry et al. | |
| 8,205,432 B2 | 6/2012 | Sheridan | |
| 8,277,174 B2 | 10/2012 | Hasel et al. | |
| 2002/0069637 A1 | 6/2002 | Becquerelle et al. | |
| 2008/0003096 A1 | 1/2008 | Kohli et al. | |
| 2008/0116009 A1 | 5/2008 | Sheridan et al. | |
| 2008/0149445 A1 | 6/2008 | Kern et al. | |
| 2008/0190095 A1 | 8/2008 | Baran | |
| 2008/0317588 A1 | 12/2008 | Grabowski et al. | |
| 2009/0056343 A1 | 3/2009 | Suciu et al. | |
| 2009/0081035 A1 | 3/2009 | Merry et al. | |
| 2009/0293445 A1 | 12/2009 | Ress, Jr. | |
| 2010/0105516 A1 | 4/2010 | Sheridan et al. | |
| 2010/0148396 A1 | 6/2010 | Xie et al. | |
| 2010/0212281 A1 | 8/2010 | Sheridan | |
| 2010/0218483 A1 | 9/2010 | Smith | |
| 2010/0219779 A1 | 9/2010 | Bradbrook | |
| 2010/0331139 A1 | 12/2010 | McCune | |
| 2011/0056208 A1 | 3/2011 | Norris et al. | |
| 2011/0159797 A1 | 6/2011 | Beltman et al. | |
| 2011/0293423 A1 | 12/2011 | Bunker et al. | |
| 2012/0124964 A1 | 5/2012 | Hasel et al. | |

FOREIGN PATENT DOCUMENTS

| | | |
|---|---|---|
| EP | 1340903 | 9/2003 |
| EP | 2374995 | 10/2011 |
| GB | 1516041 | 6/1978 |
| GB | 2041090 | 9/1980 |
| GB | 2426792 | 12/2006 |
| WO | 2007038674 | 4/2007 |
| WO | 2009148655 A2 | 12/2009 |
| WO | 2010042215 | 4/2010 |

OTHER PUBLICATIONS

Honeywell LF507. Jane's Aero-engines, Aero-engines—Turbofan. Feb. 9, 2012.

Honeywell TFE731. Jane's Aero-engines, Aero-engines—Turbofan. Jul. 18, 2012.

NASA Conference Publication. Quiet, powered-lift propulsion. Cleveland, Ohio. Nov. 14-15, 1978. pp. 1-420.

"Civil Turbojet/Turbofan Specifications", Jet Engine Specification Database (Apr. 3, 2005).

(56) References Cited

OTHER PUBLICATIONS

Kandebo, S.W. (1993). Geared-turbofan engine design targets cost, complexity. Aviation Week & Space Technology, 148(8). Start p. 32.
Hendricks, E.S. and Tong, M.T. (2012). Performance and weight estimates for an advanced open rotor engine. NASA/TM-2012-217710. pp. 1-13.
Guynn, M. D., Berton, J.J., Fisher, K. L., Haller, W.J., Tong, M. T., and Thurman, D.R. (2011). Refined exploration of turbofan design options for an advanced single-aisle transport. NASA/TM-2011-216883. pp. 1-27.
Zalud, T. (1998). Gears put a new spin on turbofan performance. Machine Design, 70(20), p. 104.
Translation of European Opposition against European Patent Application No. EP2776677 held by United Technologies Corpration. Mailed Mar. 23, 2016.
Kjelgaard, C. (2010). Gearing up for the GTF. Aircraft Technology. Issue 105. pp. 86-95.
Moxon, J. (1983). How to save fuel in tomorrow's engines. Flight International No. 3873. vol. 124. pp. 272-273.
Digital Press Kit. Pratt & Whitney PurePower Engine: This changes everything. pp. 4-6.
Norris, G. (2009). Aeronautics/propulsion laureate; Pratt & Whitney's geared turbofan development team. Aviation Week & Space Technology. Mar. 16, 2016. Republished in Pratt & Whitney Digital Press Kit. p. 10.
Petition for Inter Partes Review of U.S. Pat. No. 8,337,149. *General Electric Company*, Petitioner, v. *United Technologies Corporation*, Patent Owner. Apr. 8, 2016. (IPR 2016-00855).
Declaration of Reza Abhari, Ph.D. In re U.S. Pat. No. 8,337,149. Executed Apr. 5, 2016. pp. 1-77.
Brines, G. (1990). The turbofan of tomorrow. Mechanical Engineering: Engineering Theatrical Magic. Aug. 1990. pp. 65-67.
El-Sayad, A.F. (2008). Aircraft propulsion and gas turbine engines. Taylor & Francis Group. Boca Raton, Florida. pp. 215-219 and 855-859.
Roux, E. (2007). Turbofan and turbojet engines database handbook. Editions Elodie Roux. Blagnac: France. pp. 1-595.
European Search Report for European Patent Application No. 15166722.7 completed Sep. 2, 2015.
European Search Report for European Patent Application No. 12861657 completed Sep. 3, 2014.
Gas power cycle—Jet propulsion technology, a case study. Machine Design Magazine. Nov. 5, 1998. Retrieved May 31, 2012 from http://machinedesign.com/content/pw8000-0820.
McMillian, A. (2008) Material development for fan blade containment casing. Abstract. p. 1. Conference on Engineering and Physics: Synergy for Success 2006. Journal of Physics: Conference Series vol. 105. London, UK. Oct. 5, 2006.
Kurzke, J. (2009). Fundamental differences between conventional and geared turbofans. Proceedings of ASME Turbo Expo: Power for Land, Sea, and Air. 2009, Orlando, Florida. pp. 145-153.
Agarwal, B.D and Broutman, L.J. (1990). Analysis and performance of fiber composites, 2nd Edition. John Wiley & Sons, Inc. New York: New York. pp. 1-30, 50-51, 56-58, 60-61, 64-71, 87-89, 324-329, 436-437.
Carney, K., Pereira, M. Revilock, and Matheny, P. (2003). Jet engine fan blade containment using two alternate geometries. 4th European LS-DYNA Users Conference. pp. 1-10.
Brines, G.L. (1990). The turbofan of tomorrow. Mechanical Engineering: The Journal of the American Society of Mechanical Engineers, 108(8), 65-67.
Faghri, A. (1995). Heat pipe and science technology. Washington, D.C.: Taylor & Francis. pp. 1-60.
Hess, C. (1998). Pratt & Whitney develops geared turbofan. Flug Revue 43(7). Oct. 1998.
Grady, J.E., Weir, D.S., Lamoureux, M.C., and Martinez, M.M. (2007). Engine noise research in NASA's quiet aircraft technology project. Papers from the International Symposium on Air Breathing Engines (ISABE). 2007.
Griffiths, B. (2005). Composite fan blade containment case. Modern Machine Shop. Retrieved from: http://www.mmsonline.com/articles/composite-fan-blade-containment-case pp. 1-4.
Hall, C.A. and Crichton, D. (2007). Engine design studies for a silent aircraft. Journal of Turbomachinery, 129, 479-487.
Haque, A. and Shamsuzzoha, M., Hussain, F., and Dean, D. (2003). S20-glass/epoxy polymer nanocomposites: Manufacturing, structures, thermal and mechanical properties. Journal of Composite Materials, 37 (20), 1821-1837.
Brennan, P.J. and Kroliczek, E.J. (1979). Heat pipe design handbook. Prepared for National Aeronautics and Space Administration by B & K Engineering, Inc. Jun. 1979. pp. 1-348.
Horikoshi, S. and Serpone, N. (2013). Introduction to nanoparticles. Microwaves in nanoparticle synthesis. Wiley-VCH Verlag GmbH & Co. KGaA. pp. 1-24.
Kerrebrock, J.L. (1977). Aircraft engines and gas turbines. Cambridge, MA: The MIT Press. p. 11.
Xie, M. (2008). Intelligent engine systems: Smart case system. NASA/CR-2008-215233. pp. 1-31.
Knip, Jr., G. (1987). Analysis of an advanced technology subsonic turbofan incorporating revolutionary materials. NASA Technical Memorandum. May 1987. pp. 1-23.
Willis, W.S. (1979). Quiet clean short-haul experimental engine (QCSEE) final report. NASA/CR-159473 pp. 1-289.
Kojima, Y., Usuki, A. Kawasumi, M., Okada, A., Fukushim, Y., Kurauchi, T., and Kamigaito, O. (1992). Mechanical properties of nylon 6-clay hybrid. Journal of Materials Research, 8(5), 1185-1189.
Kollar, L.P. and Springer, G.S. (2003). Mechanics of composite structures. Cambridge, UK: Cambridge University Press. p. 465.
Ramsden, J.M. (Ed). (1978). The new European airliner. Flight International, 113(3590). Jan. 7, 1978. pp. 39-43.
Langston, L. and Faghri, A. Heat pipe turbine vane cooling. Prepared for Advanced Turbine Systems Annual Program Review. Morgantown, West Virginia. Oct. 17-19, 1995. pp. 3-9.
Oates, G.C. (Ed). (1989). Aircraft propulsion systems and technology and design. Washington, D.C.: American Institute of Aeronautics, Inc. pp. 341-344.
Lau, K., Gu, C. and Hui, D. (2005). A critical review on nanotube and nanotube/nanoclay related polymer composite materials. Composites: Part B 37(2006) 425-436.
Shorter Oxford English dictionary, 6th Edition. (2007). vol. 2, N-Z. p. 1888.
Lynwander, P. (1983). Gear drive systems: Design and application. New York, New York: Marcel Dekker, Inc. pp. 145, 355-358.
Sweetman, B. and Sutton, O. (1998). Pratt & Whitney's surprise leap. Interavia Business & Technology, 53.621, p. 25.
Mattingly, J.D. (1996). Elements of gas turbine propulsion. New York, New York: McGraw-Hill, Inc. pp. 8-15.
Pyrograf-III Carbon Nanofiber. Product guide. Retrieved Dec. 1, 2015 from: http://pyrografproducts.com/Merchant5/merchant.mvc?Screen=cp_nanofiber.
Nanocor Technical Data for Epoxy Nanocomposites using Nanomer 1.30E Nanoclay. Nnacor, Inc. Oct. 2004.
Ratna, D. (2009). Handbook of thermoset resins. Shawbury, UK: iSmithers. pp. 187-216.
Wendus, B.E., Stark, D.F., Holler, R.P., and Funkhouser, M.E. (2003). Follow-on technology requirement study for advanced subsonic transport. NASA/CR-2003-212467. pp. 1-37.
Silverstein, C.C., Gottschlich, J.M., and Meininger, M. The feasibility of heat pipe turbine vane cooling. Presented at the International Gas Turbine and Aeroengine Congress and Exposition, the Hague, Netherlands. Jun. 13-16, 1994.pp. 1-7.
Merriam-Webster's collegiate dictionary, 11th Ed. (2009). p. 824.
Merriam-Webster's collegiate dictionary, 10th Ed. (2001). p. 1125-1126.
Whitaker, R. (1982). ALF 502: plugging the turbofan gap. Flight International, p. 237-241, Jan. 30, 1982.
Hughes, C. (2010). Geared turbofan technology. NASA Environmentally Responsible Aviation Project. Green Aviation Summit. NASA Ames Research Center. Sep. 8-9, 2010. pp. 1-8.

(56) References Cited

OTHER PUBLICATIONS

Gliebe, P.R. and Janardan, B.A. (2003). Ultra-high bypass engine aeroacoustic study. NASA/CR-2003-21252. GE Aircraft Engines, Cincinnati, Ohio. Oct. 2003. pp. 1-103.
Moxon, J. How to save fuel in tomorrow's engines. Flight International. Jul. 30, 1983. 3873(124). pp. 272-273.
File History for U.S. Appl. No. 12/131,876.
Cusick, M. (1981). Avco Lycoming's ALF 502 high bypass fan engine. Society of Automotive Engineers, inc. Business Aircraft Meeting & Exposition. Wichita, Kansas. Apr. 7-10, 1981. pp. 1-9.
Fledderjohn, K.R. (1983). The TFE731-5: Evolution of a decade of business jet service. SAE Technical Paper Series. Business Aircraft Meeting & Exposition. Wichita, Kansas. Apr. 12-15, 1983. pp. 1-12.
Dickey, T.A. and Dobak, E.R. (1972). The evolution and development status of ALF 502 turbofan engine. National Aerospace Engineering and Manufacturing Meeting. San Diego, California. Oct. 2-5, 1972. pp. 1-12.
Gunston, B. (Ed.) (2000). Jane's aero-engines, Issue seven. Coulsdon, Surrey, UK: Jane's Information Group Limited. pp. 510-512.
Ivchenko-Progress D-436. Jane's Aero-engines, Aero-engines—Turbofan. Feb. 8, 2012.
Ivchenko-Progress Al-727M. Jane's Aero-engines, Aero-engines—Turbofan. Nov. 27, 2011.
Ivchenko-Progress D-727. Jane's Aero-engines, Aero-engines—Turbofan. Feb. 7, 2007.
Turbomeca Aubisque. Jane's Aero-engines, Aero-engines—Turbofan. Nov. 2, 2009.
Aviadvigatel D-110. Jane's Aero-engines, Aero-engines—Turbofan. Jun. 1, 2010.
Rolls-Royce M45H. Jane's Aero-engines, Aero-engines—Turbofan. Feb. 24, 2010.
Honeywell LF502. Jane's Aero-engines, Aero-engines—Turbofan. Feb. 9, 2012.
Decision Institution of Inter Partes Review. *General Electric Company.*, Petitioner, v. *United Technologies Corp.*, Patent Owner. IPR2017-00999. U.S. Pat. No. 8,277,174. Entered Jul. 6, 2017. pp. 1-4.
Spadaccini, L.J., and Huang, H. (2002). On-line fuel deoxygenation for coke suppression. ASME, Jun. 2002. pp. 1-7.
Darrah, S. (1987). Jet fuel deoxygenation. Interim Report for Period Mar. 1987-Jul. 1988. pp. 1-22.
Bucknell, R.L. (1973). Influence of fuels and lubricants on turbine engine design and performance, fuel and lubircant analyses. Final Technical Report, Mar. 1971-Mar. 1973. pp. 1-252.
Hazlett, R.N. (1991). Thermal oxidation stability of aviation turbine fuels. Philadelphia, PA: ASTM. pp. 1-163.
Taylor, W.F. (1974). Deposit formation from deoxygenated hydrocarbons. I. General features. Ind. Eng. Chem., Prod. Res. Develop., vol. 13(2). 1974. pp. 133-138.
Taylor, W.F. (1974). Deposit formation from deoxygenated hydrocarbons. II. Effect of trace sulfur compounds. Ind. Eng. Chem., Prod. Res. Dev., vol. 15(1). 1974. pp. 64-68.
Taylor, W.F. and Frankenfeld, J.W. (1978). Deposit fromation from deoxygenated hydrocarbons. 3. Effects of trace nitrogen and oxygen compounds. Ind. Eng. Chem., Prod. Res. Dev., vol. 17(1). 1978. pp. 86-90.
Frankenfeld, J.W. and Taylor, W.F. (1980). Deposit fromation from deoxygenated hydrocarbons. 4. Studies in pure compound systems. Ind. Eng. Chem., Prod. Res. Dev., vol. 19(1). 1978. pp. 65-70.
Hemighaus, G., Boval, T., Bacha, J., Barnes, F., Franklin, M., Gibbs, L., . . . Morris, J. (2007). Aviation fuels: Techincal review. Chevron Products Company. pp. 1-94. Retrieved from: https://www.cgabusinessdesk.com/document/aviation_tech_review.pdf.
Spadaccini, L.J., Sobel, D.R., and Huang, H. (2001). Deposit formation and mitigation in aircraft fuels. Journal of Eng. for Gas Turbine and Power, vol. 123. Oct. 2001. pp. 741-746.
Edwards, T. and Zabarnick, S. (1993). Supercritical fuel deposition mechanisms. Ind. Eng. Chem. Res. vol. 32. 1993. pp. 3117-3122.

Huang, H., Sobel, D.R., and Spadaccini, L.J. (2002). Endothermic heat-sink of hydrocarbon fuels for scramjet cooling. AIAA/ASME/SAE/ASEE, Jul. 2002. pp. 1-7.
Bessarabov, D.G., Jacobs, E.P., Sanderson, R.D., and Beckman, I.N. (1996). Use of nonporous polymeric flat-sheet gas-separation membranes in a membrane-liquid contactor: experimental studies. Journal of Membrane Sciences, vol. 113. 1996. pp. 275-284.
Matsumoto, T., Toshiro, U., Kishida, A., Tsutomu, F., Maruyama, I., and Akashi, M. (1996). Novel functional polymers: Poly (dimethylsiloxane)—polyamide multiblock copolymer. VII. Oxygen permeability of aramid-silicone membranes in a gas-membrane-liquid system. Journal of Applied Polymer Science, vol. 64(6). May 9, 1997. pp. 1153-1159.
Technical Data. Teflon. WS Hampshire Inc. Retrieved from: http://catalog.wshampshire.com/Asset/psg_teflon_ptfe.pdf.
Anderson, N.E., Loewenthal, S.H., and Black, J.D. (1984). An analytical method to predict efficiency of aircraft gearboxes. NASA Technical Memorandum prepared for the Twentieth Joint Propulsion Conference. Cincinnati, OH. Jun. 11-13, 1984. pp. 1-25.
Edkins, D.P., Hirschkron, R., and Lee, R. (1972). TF34 turbofan quiet engine study. Final Report prepared for NASA. NASA-CR-120914. Jan. 1, 1972. pp. 1-99.
Waters, M.H. and Schairer, E.T. (1977). Analysis of turbofan propulsion system weight and dimensions. NASA Technical Memorandum. Jan. 1977. pp. 1-65.
Meyer, A.G. (1988). Transmission development of TEXTRON Lycoming's geared fan engine. Technical Paper. Oct. 1988. pp. 1-12.
Dudley, D.W., Ed. (1962). Gear handbook. New York, NY: McGraw-Hill. pp. 14-17 (TOC, Preface, and Index).
Hughes, C. (2002). Aerodynamic performance of scale-model turbofan outlet guide vanes designed for low noise. Prepared for the 40th Aerospace Sciences Meeting and Exhibit. Reno, NV. NASA/TM-2001-211352. Jan. 14-17, 2002. pp. 1-38.
Kaplan, B., Nicke, E., Voss, C. (2006), Design of a highly efficient low-noise fan for ultra-high bypass engines. Proceedings of GT2006 for ASME Turbo Expo 2006: Power for Land, Sea and Air. Barcelona, SP. May 8-11, 2006. pp. 1-10.
Gates, D. Bombardier flies at higher market. Seattle Times.
Decker, S. and Clough, R. (2016). GE wins shot at voiding pratt patent in jet-engine clash. Bloomberg Technology. Retrieved from: https://www.bloomberg.com/news/articles/2016-06-30/ge-wins-shot-to-invalidate-pratt-airplane-engine-patent-in-u-s.
Trembley, Jr., H.F. (1977). Determination of effects of ambient conditions on aircraft engine emissions. ALF 502 combustor rig testing and engine verification test. Prepared for Environmental Protection Agency. Sep. 1977. pp. 1-256.
Lewicki, D.G., Black, J.D., Savage, M., and Coy, J.J. (1985). Fatigue life analysis of a turboprop reduction gearbox. NASA Technical Memorandum. Prepared for the Design Technical Conference (ASME). Sep. 11-13, 1985. pp. 1-26.
McCune, M.E. (1993). Initial test results of 40,000 horsepower fan drive gear system for advanced ducted propulsion systems. AIAA 29th Joint Conference and Exhibit. Jun. 28-30, 1993. pp. 1-10.
Wright, G.H. and Russell, J.G. (1990). The M.455D-02 variable pitch geared fan engine demonstrator test and evaluation experience. Aeronautical Journal., vol. 84(836). Sep. 1980. pp. 268-277.
Drago, R.J. (1974). Heavy-lift helicopter brings up drive ideas. Power Transmission Design. Mar. 1987. pp. 1-15.
Krantz, T.L. (1990). Experimental and analytical evaluation of efficiency of helicopter planetary stage. NASA Technical Paper. Nov. 1990. pp. 1-19.
Heingartner, P., MBA, D., Brown, D. (2003). Determining power losses in the helical gear mesh; Case Study. ASME 2003 Design Engineering Technical Conferences. Chicago, IL. Sep. 2-6, 2003. pp. 1-7.
Petition for Inter Partes Review of U.S. Pat. No. 8,277,174. *General Electric Company*, Petitioner, v. *United Technologies Corporation*, Patent Owner. IPR2017-00999. Filed Mar. 1, 2017.
Declaration of Reza Abhari. In re U.S. Pat. No. 8,227,174. IPR2017-00999. Executed Feb. 7, 2017. pp. 1-85.
Kurzke, J. (2008). Preliminary Design, Aero-engine design: From state of the art turbofans towards innovative architectures. pp. 1-72.

(56) References Cited

OTHER PUBLICATIONS

Zamboni, G. and Xu, L. (2009). Fan root aerodynamics for large bypass gas turbine engines: Influence on the engine performance and 3D design. Proceedings of ASME Turbo Expo 2009: Power for Land, Sea and Air. Jun. 8-12, 2009, Orlando, Florida, USA. pp. 1-12.

Han, J., Dutta, S., and Ekkad, S.V. (2000). Gas turbine heat transfer and cooling technology. New York, NY: Taylor & Francis. pp. 1-25, 129-157, and 160-249.

Mattingly, J.D. (1996). Elements of gas turbine propulsion. New York, New York: McGraw-Hill, Inc. pp. 1-18, 60-62, 85-87, 95-104, 121-123, 223-234, 242-245, 278-280, 303-309, 323-326, 462-479, 517-520, 563-565, 673-675, 682-685, 697-699, 703-705, 802-805, 862-864, and 923-925.

Declaration of Reza Abhari, Ph.D. In re U.S. Pat. No. 8,844,265. Executed Jun. 28, 2016. pp. 1-91.

Declaration of John Eaton, Ph.D. In re U.S. Pat. No. 8,869,568. Executed Mar. 28, 2016. pp. 1-87.

Declaration of Reza Abhari. In re U.S. Pat. No. 8,695,920. Executed Nov. 30. pp. 1-67.

Declaration of Reza Abhari. In re U.S. Pat. No. 8,448,895. Executed Nov. 28. pp. 1-81.

Declaration of Reza Abhari. In re U.S. Pat. No. 8,695,920, claims 1-4, 7-14, 17 and 19. Executed Nov. 29. pp. 1-102.

Declaration of Dr. Magdy Attia. In re U.S. Pat. No. 8,313,280. Executed Oct. 21, 2016. pp. 1-88.

Lord, W.K., Macmartin, D.G., and Tillman, T.G. (2000). Flow control opportunities in gas turbine engines. American Institute of Aeronautics and Astronautics. pp. 1-15.

Daly, M. Ed. (2010). Jane's Aero-Engine. Issue Twenty-seven. Mar. 2010. p. 633-636.

Wilfert, G. (2008). Geared fan. Aero-Engine Design: From State of the Art Turbofans Towards Innovative Architectures, von Karman Institute for Fluid Dynamics, Belgium, Mar. 3-7, 2008. pp. 1-26.

Declaration of Dr. Magdy Attia. In re U.S. Pat. No. 8,517,668. Executed Dec. 8, 2016. pp. 1-81.

Cramoisi, G. Ed. (2012). Death in the Potomac: The crash of Air Florida Flight 90. Air Crash Investigations. Accident Report NTSB/AAR-82-8. p. 45-47.

Norton, M. and Karczub, D. (2003). Fundamentals of noise and vibration analysis for engineers. Press Syndicate of the University of Cambridge. New York: New York. p. 524.

U.S. Department of Transportation: Federal Aviation Administration Advisory Circular. Runway overrun prevention. Dated: Nov. 6, 2007. p. 1-8 and Appendix 1 p. 1-15, Appendix 2 p. 1-6, Appendix 3 p. 1-3, and Appendix 4 p. 1-5.

U.S. Department of Transportation: Federal Aviation Administration Advisory Circular. Standard operating procedures for flight deck crewmembers. Dated: Feb. 27, 2003 . . . p. 1-6 and Appendices.

Vasudevan, A.K. and Petrovic, J.J. (1992). A comparative overview of molybedenum disilicide composites. Materials Science and Engineering, A155, 1992. pp. 1-17.

Clarke, D.R. and Levi, C.G. (2003). Materials design for the next generation thermal barrier coatings. Annual. Rev. Mater. Res. vol. 33. 2003 pp. 383-417.

Lee, K.N. (2000). Current status of environmental barrier coatings for Si-Based ceramics. Surface and Coatings Technology 133-134, 2000. pp. 1-7.

Bornstein, N. (1993). Oxidation of advanced intermetallic compounds. Journal de Physique IV, 1993, 03 (C9), pp. C9-367-C9-373.

Krenkel, W., Naslain, R., and Schneider, H. Eds. (2001). High temperature ceramic matrix composites pp. 224-229. Weinheim, DE: Wiley-VCH Verlag GmbH.

Gibala, R., Ghosh, A.K., Van Aken, D.C., Srolovitz, D.J., Basu, A., Chang, H., . . . Yang, W. (1992). Mechanical behavior and interface design of MoSi2-based alloys and composites. Materials Science and Engineering, A155, 1992. pp. 147-158.

"Shah, D.M. (1992). MoSi2 and other silicides as high temperature structural materials. Superalloys 1992. The Minerals, Metals, & Materials Society. pp. 409-422."

Zhao, J.C. and Westbrook, J.H. (2003). Ultrahigh-temperature materials for jet engines. MRS Bulletin. vol. 28(9). Sep. 2003. pp. 622-630.

Tsirlin, M., Pronin, Y.E., Florina, E.K., Mukhametov, S. Kh., Khatsernov, M.A., Yun, H.M., . . . Kroke, E. (2001). Experimental investigation of multifunctional interphase coatings on SiC fibers for non-oxide high temperature resistant CMCs. High Temperature Ceramic Matrix Composites. 4th Int'l Conf. on High Temp. Ceramic Matrix Composites. Oct. 1-3, 2001. pp. 149-156.

Jacobson, N.S. (1993). Corrosion of silicon-based ceramics in combustion environments. J. Am. Ceram. Soc. 76(1). pp. 3-28.

Jorgensen, P.J., Wadsworth, M.E., and Cutler, I.B. (1961). Effects of water vapor on oxidation of silicon carbide. J. Am. Ceram. Soc. 44(6). pp. 248-261.

Xu, Y., Cheng, L., Zhang, L., Ying, H., and Zhou, W. (1999). Oxidation behavior and mechanical properties of CA SiC composites with Si—MoSi2 oxidation protection coating. J. of Mat. Sci. vol. 34. 1999. pp. 6009-6014.

Sundaram, S.K., Hsu, J-Y., Speyer, R.F. (1995). Molten glass corrosion resistance of immersed combustion-heating tube materials in e-glass. J. Am. Ceram. Soc. 78(7). pp. 1940-1946.

Jeng, Y.-L., Lavernia, E.J. (1994). Processing of molybdenum disilicide. J. of Mat. Sci. vol. 29. 1994. pp. 2557-2571.

Suzuki, Y., Morgan, P.E.D., and Niihara, K. (1998). Improvement in mechanical properties of powder-processed MoSi2 by the addition of Sc2O3 and Y2O3. J. Am. Ceram. Soci. 81(12). pp. 3141-3149.

Webster, J.D., Westwood, M.E., Hayes, F.H., Day, R.J., Taylor, R., Duran, A., . . . Vogel, W.D. (1998). Oxidation protection coatings for C/SiC based on yttrium silicate. Journal of European Ceramic Society vol. 18. 1998. pp. 2345-2350.

Petrovic, J.J., Castro, R.G., Vaidya, R.U., Peters, M.I., Mendoza, D., Hoover, R.C., and Gallegos, D.E. (2001). Molybdenum disilicide materials for glass melting sensor sheaths. Ceramic Engineering and Science Proceedings. vol. 22(3). 2001. pp. 59-64.

Kahn, H., Tayebi, N., Ballarini, R., Mullen, R.L., Heuer, A.H. (2000). Fracture toughness of polysilicon MEMS devices. Sensors and Actuators vol. 82. 2000. pp. 274-280.

Muhlstein, C.L., Stach, E.A., and Ritchie, R.O. (2002). A reaction-layer mechanism for the delayed failure of micron-scale polycrystalline silicon structural films subjected to high-cycle fatigue loading. Acta Materialia vol. 50. 2002. pp. 3579-3595.

Sundaram, S.K., Hsu, J-Y., Speyer, R.F. (1994). Molten glass corrosion resistance of immersed combustion—heating tube materials in soda-lime-silicate glass. J. Am. Ceram. Soc. 77(6). pp. 1613-1623.

Leckie, F.A. and Dal Bello, D.J. (2009). Strength and stiffness of engineering systems. Mechanical Engineering Series. Springer. pp. 1-3.

Bunker, R.S. (2005). A review of shaped hole turbine film-cooling technology. Journal of Heat Transfer vol. 127. Apr. 2005. pp. 441-453.

Davies, D. and Miller, D.C. (1971). A variable pitch fan for an ultra quiet demonstrator engine. 1976 Spring Convention: Seeds for Success in Civil Aircraft Design in the Next Two Decades. pp. 1-18.

Middleton, P. (1971). 614: VFW's jet feederliner. Flight International, Nov. 4, 1971. p. 725, 729-732.

Schaefer, J.W., Sagerser, D.R., and Stakolich, E.G. (1977). Dynamics of high-bypass-engine thrust reversal using a variable-pitch fan. Technical Report prepare for NASA. NASA-TM-X-3524. May 1, 1977. pp. 1-33.

Savelle, S.A. and Garrard, G.D. (1996). Application of transient and dynamic simulations to the U.S. Army T55-L-712 helicopter engine. The American Society of Mechanical Engineers. Presented Jun. 10-13, 1996. pp. 1-8.

Drago, R.J. and Margasahayam, R.N. (1987). Stress analysis of planet gears with integral bearings; 3D finite-element model development and test validation. 1987 MSC NASTRAN World Users Conference. Los Angeles, CA. Mar. 1987. pp. 1-14.

Baker, R.W. (2000). Membrane technology and applications. New York, NY: McGraw-Hill pp. 87-153.

Cheryan, M. (1998). Ultrafiltration and microfiltration handbook. Lancaster, PA: Tecnomic Publishing Company, Inc. pp. 171-236.

(56) References Cited

OTHER PUBLICATIONS

Seader, J.D. and Henley, E.J. (1998). Separation process principles. New York, NY: John Wiley & Sons, Inc. pp. 722-726 and 764-771.

Decision Denying Institution of Inter Pules Review. *General Electric Company*, Petitioner, v. *United Technologies Corporation*, Patent Owner. Entered Sep. 29, 2016. (IPR 2016-00855).

Judgement and Final Written Decision. U.S. Pat. No. 8,448,895. *General Electric Company*, Petitioner, v. *United Technologies Corporation*, Patent Owner. IPR2017-00425. Entered Jul. 2, 2018.

Kestner, B., Schutte, J., Gladin, J., and Mavris, D., (2011). Ultra high bypass ratio engine sizing and cycle selection study for a subsonic commercial aircraft in the n+2 timeframe. Proceedings of ASME Turbo Expo 2011. Jun. 6-10, 2011. pp. 1-11.

Mattingly, J., Heiser, W., and Pratt, D. (2002). Aircraft Engine Design Second Edition. AIAA Education Series. 2011. pp. 1-687.

Gunston, B., (2000). Jane's Aero-Engines, 7th edition, pp. 8-11, 3-47, 510-512.

Gliebe, P.R. and Janardan, B.A. (2003). Ultra-high bypass engine aeroacoustic study. NASA/CR-2003-21252. GE Aircraft Engines, Cincinnati, Ohio. Oct. 2003. pp. 1-109.

* cited by examiner

GAS TURBINE ENGINE COMPRESSOR ARRANGEMENT

CROSS-REFERENCE TO RELATED APPLICATIONS

This application is a continuation of U.S. application Ser. No. 14/179,640, filed Feb. 13, 2014, which is a continuation-in-part of U.S. application Ser. No. 13/869,057, filed Apr. 24, 2013 (now U.S. Pat. No. 9,121,367), which is a continuation of U.S. application Ser. No. 13/590,273, filed Aug. 21, 2012, which is a continuation of U.S. application Ser. No. 13/418,457, filed Mar. 13, 2012 (now U.S. Pat. No. 8,277,174), which claims priority to U.S. Provisional Application 61/604,646, filed Feb. 29, 2012, and is a continuation in-part of U.S. patent application Ser. No. 13/337,354, filed on Dec. 27, 2011 (now U.S. Pat. No. 8,337,147), and entitled "Gas Turbine Engine Compressor Arrangement," which was a continuation-in-part of U.S. patent application Ser. No. 13/294,492 filed on Nov. 11, 2011, and entitled "Gas Turbine Engine Compressor Case Mounting Arrangement," which was a continuation of U.S. patent application Ser. No. 11/858,988 filed on Sep. 21, 2007 (now U.S. Pat. No. 8,075,261), and entitled "Gas Turbine Engine Compressor Case Mounting Arrangement."

BACKGROUND

The present invention relates generally to a gas turbine engine.

Gas turbine engines are known, and typically include a compressor for compressing air and delivering it downstream into a combustion section. A fan may move air to the compressor. The compressed air is mixed with fuel and combusted in the combustion section. The products of this combustion are then delivered downstream over turbine rotors, which are driven to rotate and provide power to the engine.

The compressor includes rotors moving within a compressor case to compress air. Maintaining close tolerances between the rotors and the interior of the compressor case facilitates air compression.

Gas turbine engines may include an inlet case for guiding air into a compressor case. The inlet case is mounted adjacent the fan section. Movement of the fan section, such as during in-flight maneuvers, may move the inlet case. Some prior gas turbine engine designs support a front portion of the compressor with the inlet case while an intermediate case structure supports a rear portion of the compressor. In such an arrangement, movement of the fan section may cause at least the front portion of the compressor to move relative to other portions of the compressor.

Disadvantageously, relative movement between portions of the compressor may vary rotor tip and other clearances within the compressor, which can decrease the compression efficiency. Further, supporting the compressor with the inlet case may complicate access to some plumbing connections near the inlet case.

It would be desirable to reduce relative movement between portions of the compressor and to simplify accessing plumbing connection in a gas turbine engine.

Traditionally, a fan and low pressure compressor have been driven in one of two manners. First, one type of known gas turbine engine utilizes three turbine sections, with one driving a high pressure compressor, a second turbine rotor driving the low pressure compressor, and a third turbine rotor driving the a fan. Another typical arrangement utilizes a low pressure turbine section to drive both the low pressure compressor and the fan.

Recently it has been proposed to incorporate a gear reduction to drive the fan such that a low pressure turbine can drive both the low pressure compressor and the fan, but at different speeds.

SUMMARY

A gas turbine engine, according to an exemplary aspect of the present disclosure includes, among other things, a fan section including a fan and a gear arrangement configured to drive the fan section. A compressor section includes both a first compressor and a second compressor. A turbine section is configured to drive the compressor section and the gear arrangement. An overall pressure ratio is provided by the combination of a pressure ratio across the first compressor and a pressure ratio across the second compressor and is greater than or equal to about 35. The pressure ratio across the first compressor is greater than or equal to about 7. A pressure ratio across the fan section is less than or equal to about 1.50. The fan is configured to deliver a portion of air into the compressor section, and a portion of air into a bypass duct.

In a further non-limiting embodiment of the foregoing gas turbine engine, the first compressor is upstream of the second compressor.

In a further non-limiting embodiment of either of the foregoing gas turbine engines, the first compressor is downstream of the second compressor.

In a further non-limiting embodiment of any of the foregoing gas turbine engines, the pressure ratio across the fan section is less than or equal to about 1.45.

In a further non-limiting embodiment of any of the foregoing gas turbine engines, the overall pressure ratio is above or equal to about 50.

In a further non-limiting embodiment of any of the foregoing gas turbine engines, the geared arrangement defines a gear reduction ratio greater than or equal to about 2.3.

In a further non-limiting embodiment of any of the foregoing gas turbine engines, a bypass ratio, which is defined as a volume of air passing to the bypass duct compared to a volume of air passing into the compressor section, is greater than or equal to about 8.

In a further non-limiting embodiment of any of the foregoing gas turbine engines, the turbine section includes a fan drive turbine configured to drive the fan section, a pressure ratio across the fan drive turbine being greater than or equal to about 5.

In a further non-limiting embodiment of any of the foregoing gas turbine engines, the fan section includes a plurality of fan blades and a fan blade tip speed of each of the fan blades is less than about 1150 ft/second.

A gas turbine engine, according to an exemplary aspect of the present disclosure includes, among other things, a fan section including a fan, and a gear arrangement configured to drive the fan section. A compressor section includes both a first compressor and a second compressor. A turbine section is configured to drive the compressor section and the gear arrangement. An overall pressure ratio is provided by the combination of a pressure ratio across the first compressor and a pressure ratio across the second compressor and is greater than or equal to about 35. The pressure ratio across the first compressor is less than or equal to about 8. A pressure ratio across the fan section is less than or equal to about 1.50. The fan is configured to deliver a portion of air into the compressor section, and a portion of air into a bypass duct.

In a further non-limiting embodiment of the foregoing gas turbine engine, the first compressor is upstream of the second compressor.

In a further non-limiting embodiment of either of the foregoing gas turbine engines, the first compressor is downstream of the second compressor.

In a further non-limiting embodiment of any of the foregoing gas turbine engines, the pressure ratio across the fan section is less than or equal to about 1.45.

In a further non-limiting embodiment of any of the foregoing gas turbine engines, the overall pressure ratio is above or equal to about 50.

In a further non-limiting embodiment of any of the foregoing gas turbine engines, the pressure ratio across the second compressor is greater than or equal to about 7.

In a further non-limiting embodiment of any of the foregoing gas turbine engines, the pressure ratio across the first compressor is between about 3 and about 8, and the pressure ratio across the second compressor is between about 7 and about 15.

In a further non-limiting embodiment of any of the foregoing gas turbine engines, the geared arrangement defines a gear reduction ratio greater than or equal to about 2.3.

In a further non-limiting embodiment of any of the foregoing gas turbine engines, a bypass ratio, which is defined as a volume of air passing to the bypass duct compared to a volume of air passing into the compressor section, being greater than or equal to about 8.

In a further non-limiting embodiment of any of the foregoing gas turbine engines, the turbine section includes a fan drive turbine configured to drive the fan section, a pressure ratio across the fan drive turbine being greater than or equal to about 5.

In a further non-limiting embodiment of any of the foregoing gas turbine engines, the fan section includes a plurality of fan blades and a fan blade tip speed of each of the fan blades is less than about 1150 ft/second.

A gas turbine engine, according to an exemplary aspect of the present disclosure includes, among other things, a fan section including a fan, and a gear arrangement configured to drive the fan section. A compressor section includes both a first compressor and a second compressor. A turbine section is configured to drive the compressor section and the gear arrangement. An overall pressure ratio is provided by the combination of a pressure ratio across the first compressor and a pressure ratio across the second compressor, the pressure ratio across the first compressor being less than about 8, and the pressure ratio across the second compressor being greater than or equal to about 7. A pressure ratio across the fan section is less than or equal to about 1.50. The fan is configured to deliver a portion of air into the compressor section, and a portion of air into a bypass duct.

In a further non-limiting embodiment of the foregoing gas turbine engine, the first compressor is upstream of the second compressor.

In a further non-limiting embodiment of the foregoing gas turbine engine, the first compressor is downstream of the second compressor.

In a further non-limiting embodiment of the foregoing gas turbine engine, the pressure ratio across the fan section is less than or equal to about 1.45.

In a further non-limiting embodiment of the foregoing gas turbine engine, the overall pressure ratio is greater than or equal to about 35.

In a further non-limiting embodiment of the foregoing gas turbine engine, the geared arrangement defines a gear reduction ratio greater than or equal to about 2.3.

In a further non-limiting embodiment of the foregoing gas turbine engine, a bypass ratio, which is defined as a volume of air passing to the bypass duct compared to a volume of air passing into the compressor section, being greater than or equal to about 8.

In a further non-limiting embodiment of the foregoing gas turbine engine, the turbine section includes a fan drive turbine configured to drive the fan section, a pressure ratio across the fan drive turbine being greater than or equal to about 5.

An arrangement for a gas turbine engine, according to an exemplary aspect of the present disclosure includes, among other things, a fan section having a central axis, a compressor case for housing a compressor, and an inlet case for guiding air to the compressor, the compressor case positioned axially further from the fan section than the inlet case. A support member extends between the fan section and the compressor case wherein the support member restricts movement of the compressor case relative to the inlet case. The compressor case includes a front compressor case portion and a rear compressor case portion, the rear compressor case portion being axially further from the inlet case than the front compressor case portion. The support member extends between the fan section and the front compressor case portion, and the inlet case is removable from the gas turbofan engine separately from the compressor case. The compressor case includes a first compressor section and a second compressor section. A turbine section drives at least one of the first and second compressor sections, and a gear arrangement is driven by the turbine section such that the gear arrangement drives the fan section. A plumbing connection area is positioned upstream of the support member to be utilized for maintenance and repair.

The various features and advantages of this invention will become apparent to those skilled in the art from the following detailed description of an embodiment. The drawings that accompany the detailed description can be briefly described as follows.

DETAILED DESCRIPTION

Figure 1:
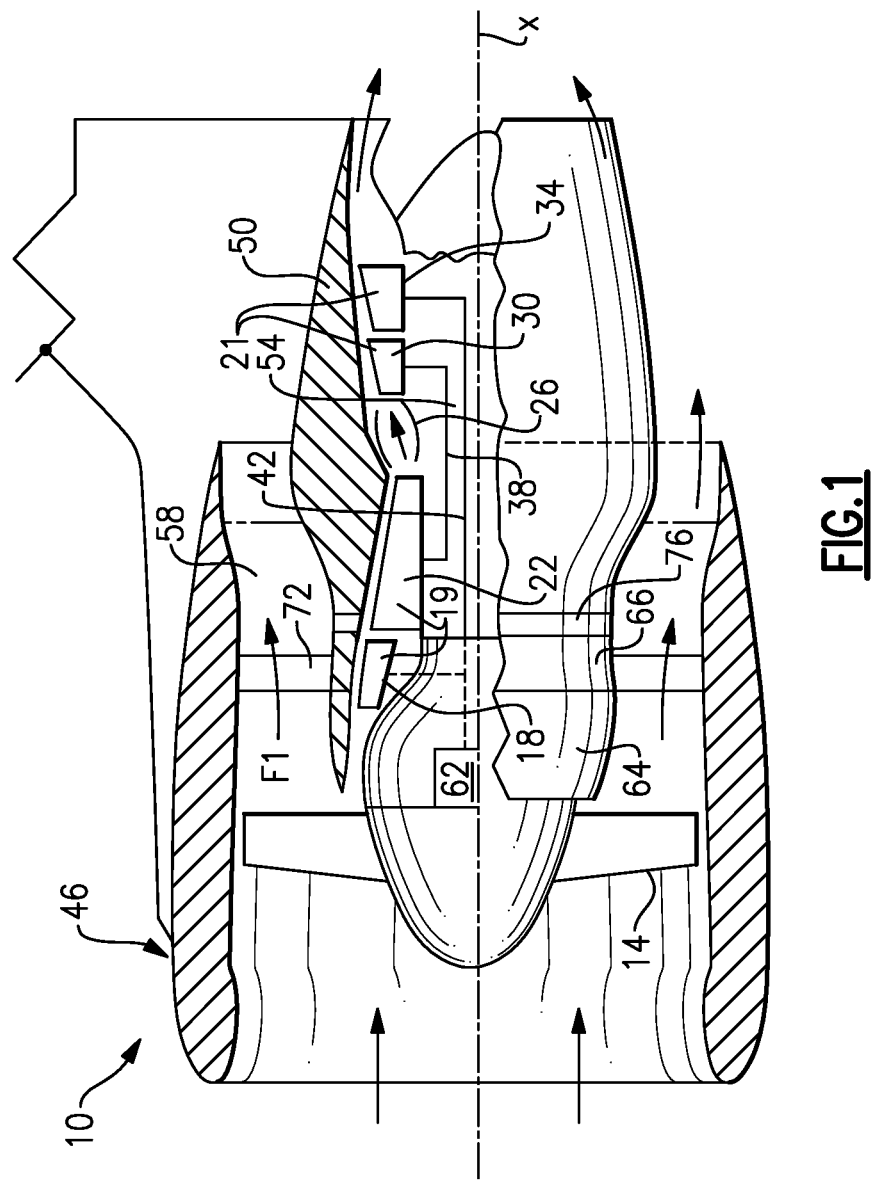
FIG. 1 illustrates a schematic sectional view of an embodiment of a gas turbine engine.

FIG. 1 schematically illustrates an example gas turbine engine 10 including (in serial flow communication) a fan section 14, a compressor section 19 that includes a low pressure (or first) compressor section 18 and a high pressure (or second) compressor section 22, a combustor 26, and a turbine section 21 that includes a high pressure (or second) turbine section 30 and a low pressure (or first) turbine section 34. The gas turbine engine 10 is circumferentially disposed about an engine centerline X. During operation, air is pulled into the gas turbine engine 10 by the fan section 14, pressurized by the compressors 18, 22 mixed with fuel, and burned in the combustor 26. Hot combustion gases generated within the combustor 26 flow through high and low pressure turbines 30, 34, which extract energy from the hot combustion gases. As used herein, a "high pressure" compressor or turbine experiences a higher pressure that a corresponding "low pressure" compressor or turbine.

In a two-spool design, the high pressure turbine 30 utilizes the extracted energy from the hot combustion gases to power the high pressure compressor 22 through a high speed shaft 38, and a low pressure turbine 34 utilizes the energy extracted from the hot combustion gases to power the low pressure compressor 18 and the fan section 14 through a low speed shaft 42. However, the invention is not limited to the two-spool gas turbine architecture described and may be used with other architectures such as a single-spool axial design, a three-spool axial design and other architectures. That is, there are various types of gas turbine engines, many of which could benefit from the examples disclosed herein, which are not limited to the design shown.

The example gas turbine engine 10 is in the form of a high bypass ratio turbine engine mounted within a nacelle or fan casing 46, which surrounds an engine casing 50 housing a core engine 54. A significant amount of air pressurized by the fan section 14 bypasses the core engine 54 for the generation of propulsion thrust. The airflow entering the fan section 14 may bypass the core engine 54 via a fan bypass passage 58 extending between the fan casing 46 and the engine casing 50 for receiving and communicating a discharge airflow F1. The high bypass flow arrangement provides a significant amount of thrust for powering an aircraft.

The gas turbine engine 10 may include a geartrain 62 for controlling the speed of the rotating fan section 14. The geartrain 62 can be any known gear system, such as a planetary gear system with orbiting planet gears, a planetary system with non-orbiting planet gears or other type of gear system. The low speed shaft 42 may drive the geartrain 62. In the disclosed example, the geartrain 62 has a constant gear ratio. It should be understood, however, that the above parameters are only exemplary of a contemplated geared gas turbine engine 10. That is, aspects of the invention are applicable to traditional turbine engines as well as other engine architectures.

The engine 10 in one example is a high-bypass geared aircraft engine. In a further example, the engine 10 bypass ratio is greater than about six (6), with an example embodiment being greater than ten (10), the geared architecture 62 is an epicyclic gear train, such as a planetary gear system or other gear system, with a gear reduction ratio of greater than about 2.3 and the low pressure turbine 34 has a pressure ratio that is greater than or equal to about 5. In one example, the geared architecture 62 includes a sun gear, a ring gear, and intermediate gears arranged circumferentially about the sun gear and intermeshing with the sun gear and the ring gear. The intermediate gears are star gears grounded against rotation about the axis X. The sun gear is supported by the low speed shaft 38, and the ring gear is interconnected to the fan 14.

In one disclosed embodiment, the engine 10 bypass ratio is greater than about ten (10:1), the fan diameter is significantly larger than that of the low pressure compressor 18, and the low pressure turbine 34 has a pressure ratio that is greater than or equal to about 5:1. Low pressure turbine 34 pressure ratio is pressure measured prior to inlet of low pressure turbine 34 as related to the pressure at the outlet of the low pressure turbine 34 prior to an exhaust nozzle. The geared architecture 62 may be an epicycle gear train, such as a planetary gear system or other gear system, with a gear reduction ratio of greater than about 2.3:1, and more specifically greater than about 2.6:1. It should be understood, however, that the above parameters are only exemplary of one embodiment of a geared architecture engine and that the present invention is applicable to other gas turbine engines including direct drive turbofans.

A significant amount of thrust is provided by a bypass flow through the bypass passage 58 due to the high bypass ratio. The fan section 14 of the engine 10 is designed for a particular flight condition—typically cruise at about 0.8 Mach and about 35,000 feet. The flight condition of 0.8 Mach and 35,000 ft, with the engine at its best fuel consumption—also known as "bucket cruise Thrust Specific Fuel Consumption ('TSFCT')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of [((Tambient deg R)/518.7)^0.5]. The "Low corrected fan tip speed" as disclosed herein according to one non-limiting embodiment is less than about 1150 ft/second. The above parameters for the engine 20 are intended to be exemplary.

Figure 2:
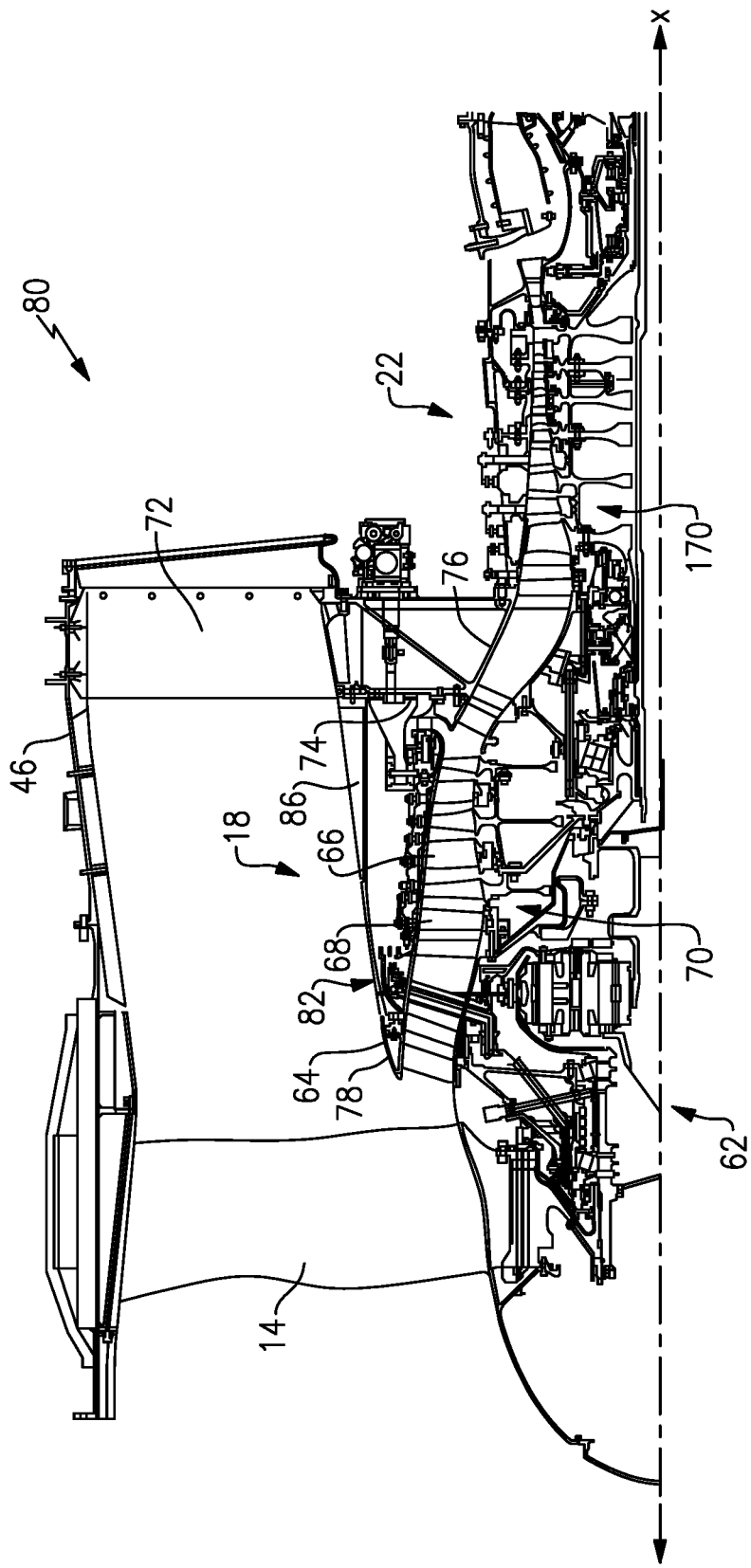
FIG. 2 illustrates a sectional view of a prior art compressor case mounting arrangement. Notably, some aspects are not prior art.

As shown in FIG. 2, the example engine casing 50 generally includes at least an inlet case portion 64, a low pressure compressor case portion 66, and an intermediate case portion 76. The inlet case 64 guides air to the low pressure compressor case 66. The low pressure compressor case 66 in an example prior art gas turbine engine 80 supports a plurality of compressor stator vanes 68. Notably, the low pressure compressor section 18, and the high pressure compressor section 22, and the arrangement of the low rotor 70 and high rotor 170, respectively, are not part of the prior art. The low rotor 70 rotates about the central axis X, and, with the compressor stator vanes 68, help compress air moving through the low pressure compressor case 66. Downstream of the low pressure compressor the air passes into the high pressure compressor section 22, and is further compressed by its rotor 170. The mounting of the compressor as shown in FIG. 2 is prior art, however, the structure of the low pressure compressor section 18 and high pressure compressor section 22, and the rotors 70 and 170 were not part of the prior art.

A plurality of guide vanes 72 secure the intermediate case 76 to the fan casing 46. Formerly, the guide vanes 72 each included at least a rear attachment 74 and a forward attachment 78. The rear attachment 74 connects to an intermediate case 76 while the forward attachment 78 connects to the inlet case 64. The lower pressure compressor case 66 was thus supported through the intermediate case 76 and the inlet case 64.

In the prior art, a plumbing connection area 82 is positioned between the rear attachment 74 and the forward attachment 78. The plumbing connection area 82 includes connections used for maintenance and repair of the gas turbine engine 80, such as compressed air attachments, oil attachments, etc. The forward attachment 78 extends to the inlet case 64 from at least one of the guide vanes 72 and covers portions of the plumbing connection area 82. A fan stream splitter 86, a type of cover, typically attaches to the forward attachment 78 to shield the plumbing connection area 82.

Figure 3:
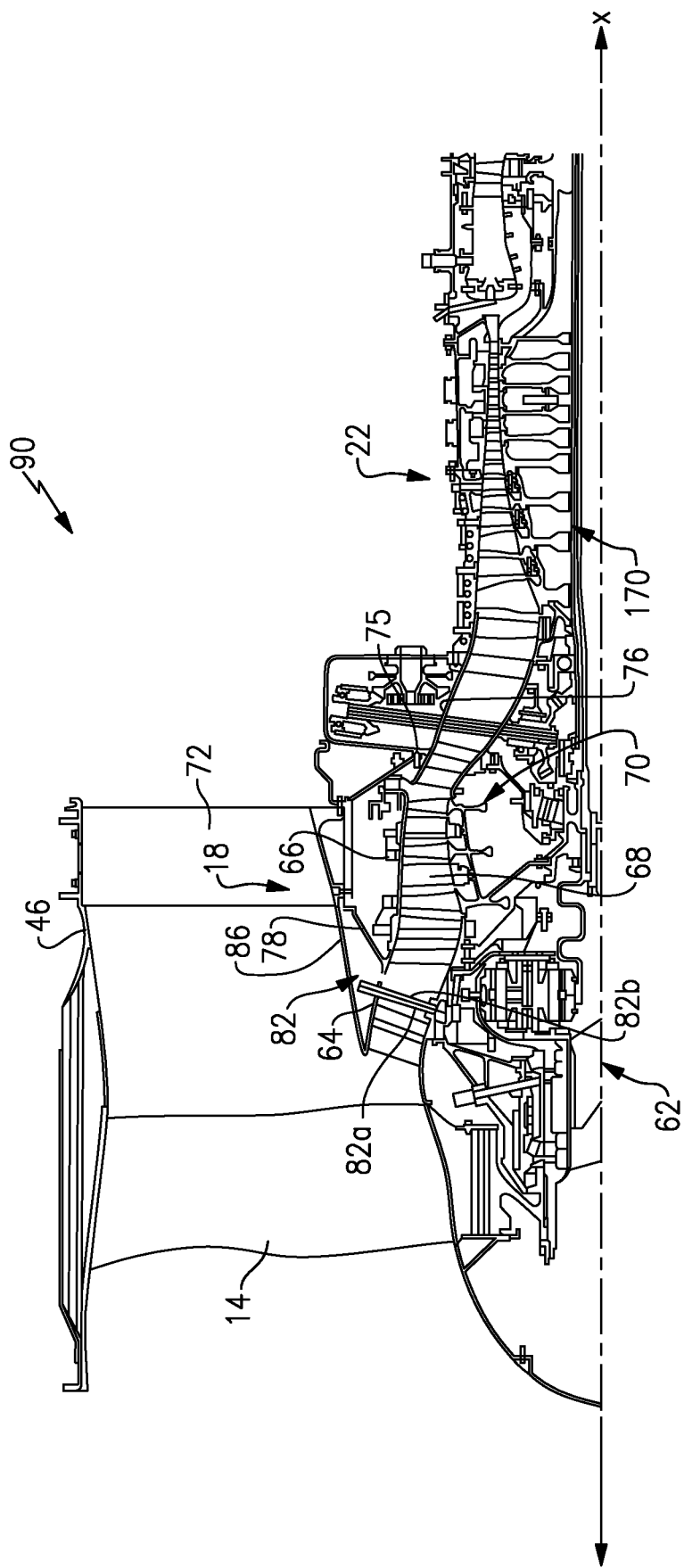
FIG. 3 illustrates a sectional view of an example compressor case mounting arrangement of an embodiment of the current invention.

Referring now to an example of the present invention shown in FIG. 3, in the turbine engine 90, the forward attachment 78 attaches to a front portion of the low pressure compressor case 66. In this example, the forward attachment 78 extends from the guide vane 72 to support the low pressure compressor case 66. Together, the forward attachment 78 and guide vane 72 act as a support member for the low pressure compressor case 66. The plumbing connection area 82 (which includes connections used for maintenance and repair of the gas turbine engine 90, such as compressed air attachments, oil attachments, etc) is positioned upstream of the forward attachment 78 facilitating access to the plumbing connection area 82. In contrast, the plumbing connection area of prior art embodiments was typically positioned between the rear attachment and the forward attachment and the forward attachment typically extended to the inlet case from at least one of the guide vanes, thereby covering portions of the plumbing connection area, which complicated access thereto; this complicated structure was further complicated by a fan stream splitter, a type of cover, that typically was attached to the forward attachment to shield the plumbing connection area.

In the embodiment shown in FIG. 3, an operator may directly access the plumbing connection area 82 after removing the fan stream splitter 86. The plumbing connection area 82 typically provides access to a lubrication system 82a, a compressed air system 82b, or both. The lubrication system 82a and compressed air system 82b are typically in fluid communication with the geartrain 62.

Maintenance and repair of the geartrain 62 may require removing the geartrain 62 from the engine 90. Positioning the plumbing connection area 82 ahead of the forward attachment 78 simplifies maintenance and removal of the geartrain 62 from other portions of the engine 90. Draining oil from the geartrain 62 prior to removal may take place through the plumbing connection area 82 for example. The plumbing connection area 82 is typically removed with the geartrain 62. Thus, the arrangement may permit removing the geartrain 62 on wing or removing the inlet case 64 from the gas turbine engine 90 separately from the low pressure compressor case 66. This reduces the amount of time needed to prepare an engine for continued revenue service, saving an operator both time and money.

Connecting the forward attachment 78 to the low pressure compressor case 66 helps maintain the position of the rotor 70 relative to the interior of the low pressure compressor case 66 during fan rotation, even if the fan section 14 moves. In this example, the intermediate case 76 supports a rear portion of the low pressure compressor case 66 near a compressed air bleed valve 75.

Figure 4:
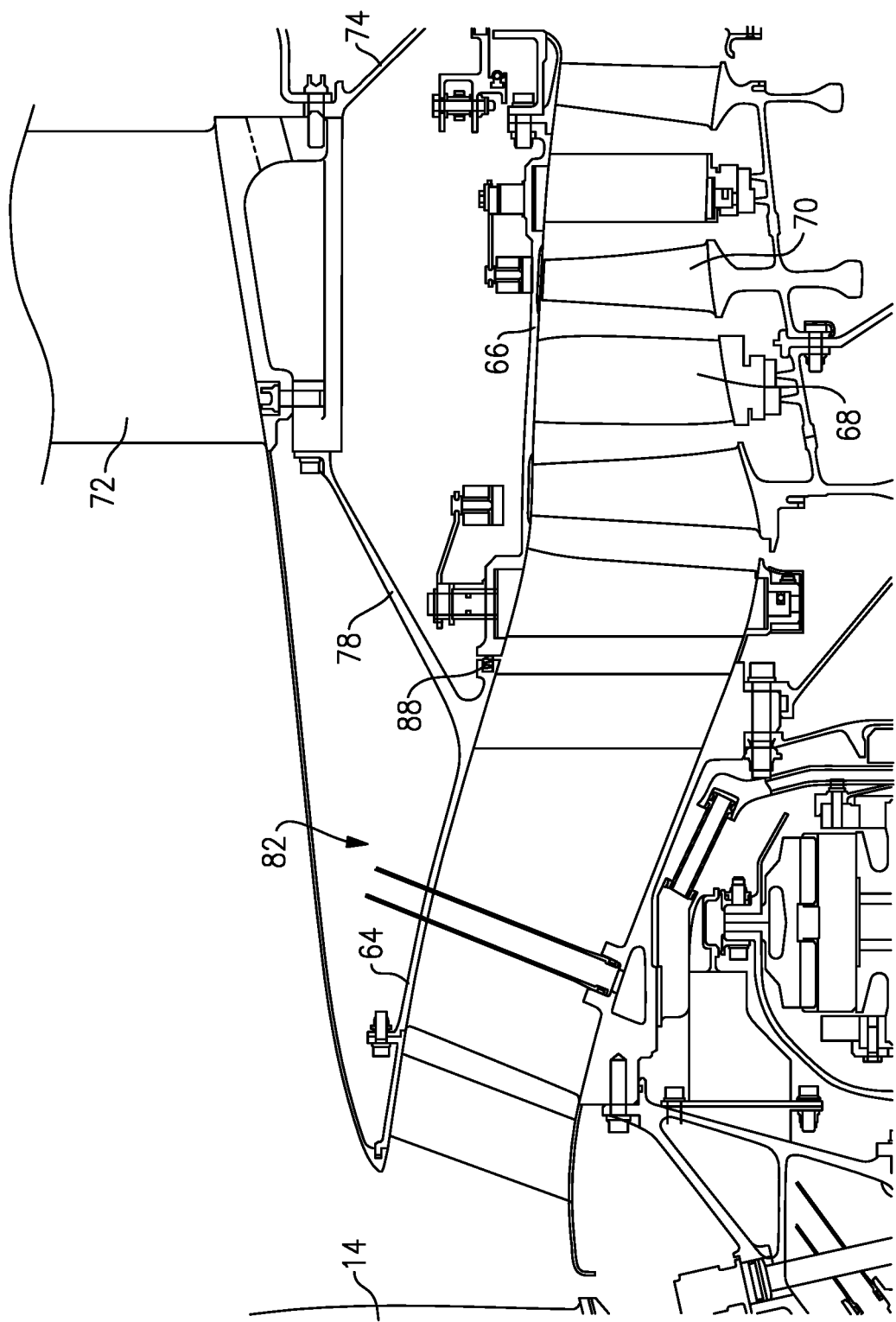
FIG. 4 illustrates a close up sectional view of the intersection between an inlet case and a low pressure compressor case in the embodiment of FIG. 3.

As shown in FIG. 4, a seal 88, such as a "W" seal, may restrict fluid movement between the inlet case 64 and the low pressure compressor case 66. In this example, the seal 88 forms the general boundary between the inlet case 64 and the low pressure compressor case 66, while still allowing some amount of movement between the cases.

Figure 5:
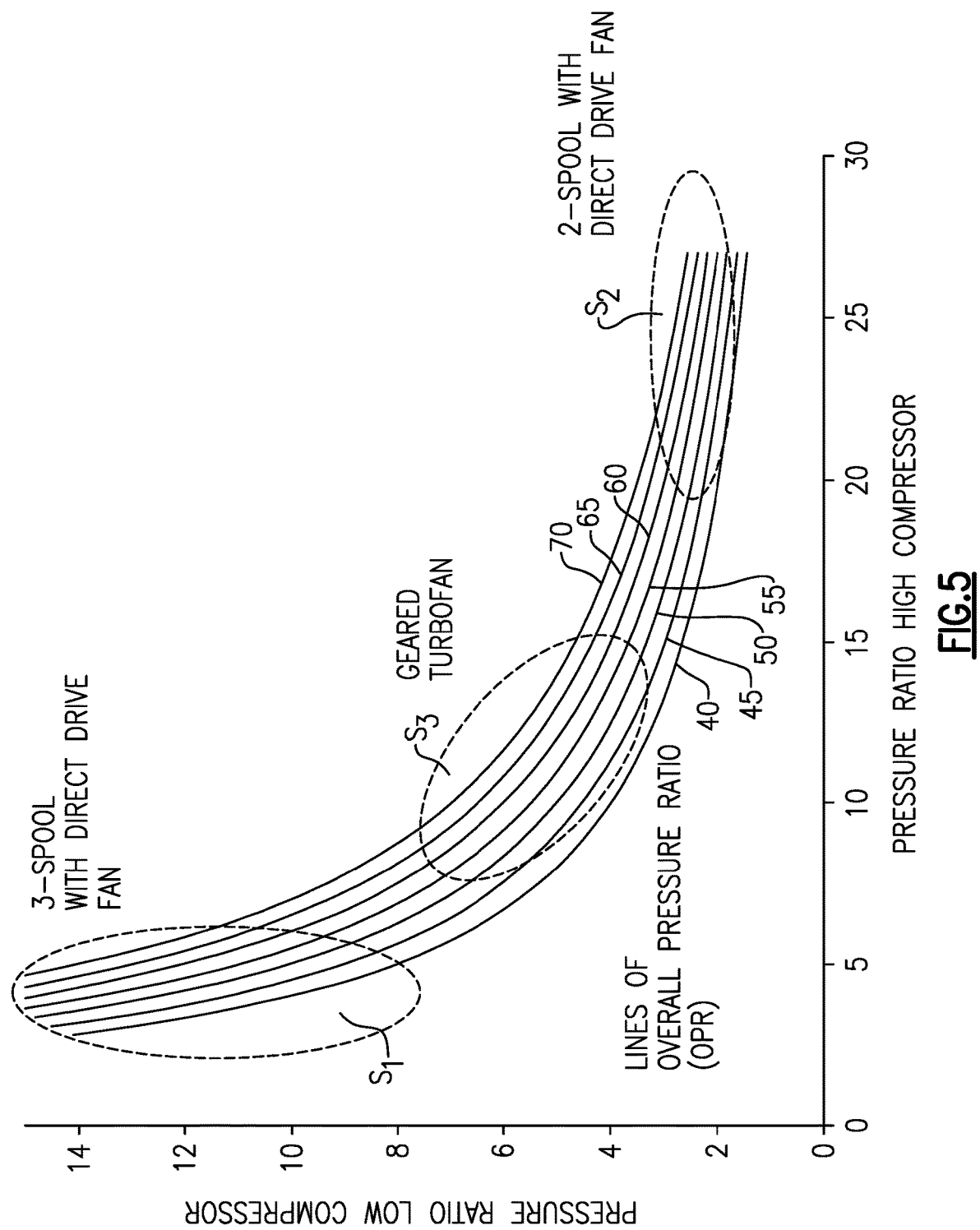
FIG. 5 graphically shows a split in the compression ratios between the low pressure and high pressure compressor sections in a gas turbine engine embodiment.

FIG. 5 shows a novel worksplit that has been invented to improve the fuel burn efficiency of a geared turbofan architecture with a fan 14 connected to the low compressor 18 through a speed reduction device such as a gearbox 62. Since a gear reduction 62 is incorporated between the fan 14 and the low pressure compressor 18, the speeds of the low pressure compressor can be increased relative to a traditional two spool direct drive arrangement. This provides freedom in splitting the amount of compression between the low pressure section 18 and the high pressure section 22 that can be uniquely exploited to improve fuel burn efficiency on the geared turbofan architecture described in FIGS. 1 and 2. This resulting worksplit is distinctly different from historical two and three spool direct drive architectures as shown in FIG. 5.

Notably, while the gear train 62 is shown axially adjacent to the fan 14, it could be located far downstream, and even aft of the low turbine section 34. As is known, the gear illustrated at 62 in FIGS. 2 and 3 could result in the fan 14 rotating in the same, or the opposite direction of the compressor rotors 70 and 170.

It is known in prior art that an overall pressure ratio (when measured at sea level and at a static, full-rated takeoff power) of at least 35:1 is desirable, and that an overall pressure ratio of greater than about 40:1 and even about 50:1 is more desirable. That is, after accounting for the fan 14 pressure rise in front of the low pressure compressor 18, the pressure of the air entering the low compressor section 18 should be compressed as much or over 35 times by the time it reaches the outlet of the high compressor section 22. This pressure rise through the low and high compressors will be referred to as the gas generator pressure ratio.

FIG. 5 shows the way that this high pressure ratio has been achieved in the two prior art engine types versus the Applicant's engine's configuration.

Area $S_1$ shows the typical operation of three spool arrangements discussed the Background Section. The pressure ratio of the low compressor (i.e., the pressure at the exit of the low pressure compressor divided by the pressure at the inlet of the low pressure compressor) is above 8, and up to potentially 15. That is, if a pressure of 1 were to enter the low pressure compressor, it would be compressed between 8 to 15 times.

As can be further seen, the high pressure compressor ratio (i.e., the pressure at the exit of the high pressure compressor divided by the pressure at the inlet of the high pressure compressor) in this arrangement need only compress a very low pressure ratio, and as low as 5 to achieve a combined gas generator pressure ratio of above 35. For example, if the low pressure compressor ratio is 10 and the high pressure compressor ratio is 3.5, the combined overall pressure ratio ("OPR") would be (10)(3.5)=35. In addition, the three spool design requires complex arrangements to support the three concentric spools.

Another prior art arrangement is shown at area $S_2$. Area $S_2$ depicts the typical pressure ratio split in a typical two spool design with a direct drive fan. As can be seen, due to the connection of the fan directly to the low pressure compressor, there is little freedom in the speed of the low pressure compressor. Thus, the low pressure compressor can only do a small amount of the overall compression. As shown, it is typically below 4 times. On the other hand, the high pressure compressor must provide an amount of compression typically more than 20 times to reach an OPR of 40 (or 50).

The $S_2$ area results in undesirably high stress on the high pressure compressor, which, in turn, yields challenges in the mounting of the high pressure spool. In other words, the direct drive system that defines the $S_2$ area presents an undesirable amount of stress, and an undesirable amount of engineering required to properly mount the high pressure spool to provide such high pressure ratios.

Applicant's current low compressor/high compressor pressure split is shown at area $S_3$. The fan is driven at a speed distinct from the low pressure compressor, and a higher compression ratio can be achieved at the low pressure compressor section than was the case at area $S_2$. Thus, as shown, the pressure ratio across the low pressure compressor may be between 4 and 8. This allows the amount of compression to be performed by the high pressure compressor to only need to be between 8 times and 15 times.

The area $S_3$ is an enabling design feature that allows the geared turbofan architecture shown in FIGS. 1 and 2 to achieve a very high gas generator OPR while avoiding the complexities of historical three spool and two spool direct drive architectures. The area $S_3$ is an improvement over both areas $S_1$ and $S_2$. As an example, a 3-4% fuel efficiency is achieved at area $S_3$ compared to area $S_1$. A fuel savings of 4-5% is achieved at area $S_3$, compared to area $S_2$.

In fact, in comparison to a gas turbine engine provided with a gear drive, but operating in the pressure ratios of area $S_2$, there is still a 2% fuel burn savings at the $S_3$ area.

As such, the area $S_3$ reduces fuel burn, and provides engineering simplicity by more favorably distributing work between the hotter high pressure spools and colder low pressure spools.

Stated another way, the present invention provides a combination of a low pressure compressor and a high pressure compressor which together provides an OPR of greater than about 35 and, in some embodiments greater than about 40, in some embodiments greater than about 50, and in some embodiments up to about 70. This high OPR is accomplished by a beneficial combination of a pressure ratio across the low pressure compressor of between about 4 and about 8 coupled with an additional pressure ratio across the high pressure ratio compressor of between about 8 and about 15.

Improved fuel consumption can be further achieved wherein the fan may be low pressure, and have a pressure ratio less than or equal to about 1.50, more specifically less than or equal to about 1.45, and even more specifically less than or equal to about 1.35. A bypass ratio, defined as the volume of air passing into bypass passage 58 compared to the volume of air in the core air flow is greater than or equal to about 8 at cruise power. The low pressure compressor may have a pressure ratio less than or equal to 8, more narrowly between 3 to 8, and even more narrowly 4 to 6, and be powered by a 4 or 5-stage low pressure turbine. In some embodiments, the first or low pressure compressor may have a pressure ratio greater than or equal to 7. The second or high compressor rotor may have a nominal pressure ratio greater than or equal to 7, more narrowly between 7 to 15, and even more narrowly 8 to 10, and may be powered by a 2-stage high pressure turbine. A gas turbine engine operating with these operational parameters provides benefits compared to the prior art.

Although an embodiment of this invention has been disclosed, a worker of ordinary skill in this art would recognize that certain modifications would come within the scope of this invention. For that reason, the following claims should be studied to determine the true scope and content of this invention.

We claim:

1. A gas turbine engine comprising:
a fan section including a fan, and an outer housing surrounding the fan to define a bypass passage;
a core engine, and bypass ratio defined as the volume of air passing into the bypass passage compared to the volume of air passing into the core engine, wherein the bypass ratio is greater than or equal to 8;
a gear arrangement that drives the fan section, the gear arrangement defining a gear reduction ratio of greater than 2.3:1;
a lubrication system and a compressed air system in fluid communication with the gear arrangement;
a compressor section, comprising both a low pressure compressor section and a high pressure compressor section, wherein the low pressure section is a three-stage compressor, and the high pressure compressor section is a nine-stage compressor;
a turbine section that drives the gear arrangement, the turbine section including a low pressure turbine with an inlet, an outlet, and a low pressure turbine pressure ratio greater than 5:1, wherein the low pressure turbine pressure ratio is a ratio of a pressure measured prior to the inlet as related to a pressure at the outlet prior to any exhaust nozzle;
wherein an overall pressure ratio is:
provided by the combination of a pressure ratio across the low pressure compressor section and a pressure ratio across the high pressure compressor section; and
greater than 50; and
wherein the pressure ratio across the high pressure compressor section is between 7 and 15; and
wherein the pressure ratio across the low pressure compressor section is between 4 and 8.

2. The gas turbine engine of claim 1, wherein the fan comprises at least one fan blade, with a fan pressure ratio of less than 1.45, the fan pressure ratio measured across the fan blade alone.

3. The gas turbine engine of claim 2, wherein the low pressure turbine is a four stage turbine.

4. The gas turbine engine of claim 3, wherein the bypass ratio is greater than 10.

5. The gas turbine engine of claim 4, wherein the turbine section further comprises a two stage high pressure turbine.

6. The gas turbine engine of claim 5, wherein:
the gear arrangement is a planetary gear system with a sun gear, a ring gear, and a plurality of orbiting planet gears arranged circumferentially about the sun gear and intermeshing with the sun gear and the ring gear; and
the overall pressure ratio is no greater than 70.

7. A gas turbine engine comprising:
a fan section including a fan comprising at least one fan blade, with a fan pressure ratio of less than 1.45, the fan pressure ratio measured across the fan blade alone, and an outer housing surrounding the fan to define a bypass passage;
a core engine, and a bypass ratio defined as the volume of air passing into the bypass passage compared to the volume of air passing into the core engine, wherein the bypass ratio is greater than or equal to 8;
a gear arrangement that drives the fan section, the gear arrangement having a gear system with a sun gear, a ring gear, and a plurality of intermediate gears arranged circumferentially about the sun gear and intermeshing with the sun gear and the ring gear;
a compressor section, comprising both a first compressor section and a second compressor section, wherein the first compressor section is a three-stage compressor, and the second compressor section is a nine-stage compressor; and
a turbine section that drives the gear arrangement, the turbine section having a four stage first turbine;

wherein an overall pressure ratio is:
provided by the combination of a pressure ratio across the first compressor section and a pressure ratio across the second compressor section; and
greater than 40; and
wherein the pressure ratio across the second compressor section is between 7 and 15; and
wherein the pressure ratio across the first compressor section is between 4 and 8.

8. The gas turbine engine of claim 7, wherein the turbine section further comprises a two stage second turbine.

9. The gas turbine engine of claim 8, where the first turbine comprises an inlet, an outlet, and a pressure ratio greater than 5:1, wherein the pressure ratio is a ratio of a pressure measured prior to the inlet as related to a pressure at the outlet prior to any exhaust nozzle.

10. The gas turbine engine of claim 9, wherein the overall pressure ratio is greater than 50.

11. The gas turbine engine of claim 10, wherein the bypass ratio is greater than 10.

12. The gas turbine engine of claim 11, further comprising a central axis, wherein the intermediate gears are star gears grounded against rotation about the central axis, the gear arrangement defining a gear reduction ratio of greater than 2.3:1, and the overall pressure ratio is no greater than 70.

13. A gas turbine engine comprising:
a fan section including a fan, and an outer housing surrounding the fan to define a bypass passage;
a core engine, and a bypass ratio defined as the volume of air passing into the bypass passage compared to the volume of air passing into the core engine, wherein the bypass ratio is greater than or equal to 8;
a gear arrangement that drives the fan section, the gear arrangement defining a gear reduction ratio of greater than 2.3:1;
a lubrication system and a compressed air system in fluid communication with the gear arrangement;
a compressor section, comprising both a low pressure compressor section and a high pressure compressor section, wherein the low pressure compressor section is a three-stage compressor, and the high pressure compressor section is a nine-stage compressor;
a turbine section that drives the gear arrangement, the turbine section including a four stage low pressure turbine, an inlet, an outlet, and a low pressure turbine pressure ratio greater than 5:1, wherein the low pressure turbine pressure ratio is a ratio of a pressure measured prior to the inlet as related to a pressure at the outlet prior to any exhaust nozzle; and
wherein an overall pressure ratio is:
provided by the combination of a pressure ratio across the low pressure compressor section and a pressure ratio across the high pressure compressor section; and
greater than 40; and
wherein the pressure ratio across the high pressure compressor section is between 7 and 15; and
wherein the pressure ratio across the low pressure compressor section is between 4 and 8.

14. The gas turbine engine of claim 13, wherein the fan has at least one fan blade, with a fan pressure ratio of less than 1.45, the fan pressure ratio measured across the fan blade alone.

15. The gas turbine engine of claim 14, wherein the bypass ratio is greater than 10.

16. The gas turbine engine of claim 15, wherein the turbine section further has a two stage high pressure turbine.

17. The gas turbine engine of claim 16, wherein the overall pressure ratio is greater than 50.

18. The gas turbine engine of claim 17, wherein the overall pressure ratio is no greater than 70.

19. A gas turbine engine comprising:
a fan section including a fan, and an outer housing surrounding the fan to define a bypass passage;
a core engine, and a bypass ratio defined as the volume of air passing into the bypass passage compared to the volume of air passing into the core engine, wherein the bypass ratio is greater than or equal to 8;
a gear arrangement that drives the fan section;
a lubrication system and a compressed air system in fluid communication with the gear arrangement;
a compressor section, comprising both a low pressure compressor section and a high pressure compressor section, wherein the low pressure compressor section is a three-stage compressor, and the high pressure compressor section is a nine-section compressor;
a turbine section that drives the gear arrangement, the turbine section having a low pressure turbine with an inlet, an outlet, and a low pressure turbine pressure ratio greater than 5:1, wherein the low pressure turbine pressure ratio is a ratio of a pressure measured prior to the inlet as related to a pressure at the outlet prior to any exhaust nozzle, and wherein the turbine section further includes a two stage high pressure turbine;
wherein an overall pressure ratio is:
provided by the combination of a pressure ratio across the low pressure compressor section and a pressure ratio across the high pressure compressor section; and
greater than 40; and
wherein the pressure ratio across the high pressure compressor section is between 7 and 15; and
wherein the pressure ratio across the low pressure compressor section is between 4 and 8.

20. The gas turbine engine of claim 19, wherein the fan has at least one fan blade, with a fan pressure ratio of less than 1.45, the fan pressure ratio measured across the fan blade alone.

21. The gas turbine engine of claim 20, wherein the bypass ratio is greater than 10.

22. The gas turbine engine of claim 21, wherein the overall pressure ratio is greater than 50.

23. The gas turbine engine of claim 22, wherein the low pressure turbine is a four stage turbine.

24. The gas turbine engine of claim 23, wherein the overall pressure ratio is no greater than 70.

25. The gas turbine engine of claim 5, wherein the low pressure turbine drives the low pressure compressor section.

26. The gas turbine engine of claim 25, wherein the pressure ratio across the low pressure compressor section is greater than or equal to 7.

27. The gas turbine engine of claim 26, wherein the pressure ratio across the high pressure compressor section is between 8 and 10, and the overall pressure ratio is no greater than 70.

* * * * *

UNITED STATES PATENT AND TRADEMARK OFFICE
CERTIFICATE OF CORRECTION

PATENT NO. : 10,830,152 B2
APPLICATION NO. : 15/184253
DATED : November 10, 2020
INVENTOR(S) : Hasel et al.

It is certified that error appears in the above-identified patent and that said Letters Patent is hereby corrected as shown below:

In the Claims

Claim 19, Column 12, Line 23, change "nine-section compressor" to --nine-stage compressor--

Signed and Sealed this
Tenth Day of October, 2023

Katherine Kelly Vidal
*Director of the United States Patent and Trademark Office*